(12) United States Patent
Kitatani et al.

(10) Patent No.: US 7,711,229 B2
(45) Date of Patent: May 4, 2010

(54) OPTICAL INTEGRATED DEVICE AND MANUFACTURING METHOD THEREOF

(75) Inventors: Takeshi Kitatani, Hino (JP); Kazunori Shinoda, Musashino (JP); Takashi Shiota, Sagamihara (JP); Shigeki Makino, Kokubunji (JP); Toshihiko Fukamachi, Kokubunji (JP)

(73) Assignee: Opnext Japan, Inc., Yokohama-shi (JP)

( * ) Notice: Subject to any disclaimer, the term of this patent is extended or adjusted under 35 U.S.C. 154(b) by 0 days.

(21) Appl. No.: 11/843,682

(22) Filed: Aug. 23, 2007

(65) Prior Publication Data

US 2008/0317422 A1   Dec. 25, 2008

(30) Foreign Application Priority Data

Jun. 20, 2007   (JP) ............... 2007-162514

(51) Int. Cl.
*G02B 6/10*   (2006.01)
*G02B 6/12*   (2006.01)

(52) U.S. Cl. ................ 385/129; 385/14; 385/50; 385/131

(58) Field of Classification Search ............ 385/14, 385/50, 129–132
See application file for complete search history.

(56) References Cited

U.S. PATENT DOCUMENTS

| 4,820,655 | A  | * | 4/1989  | Noda et al. ............... 438/24 |
| 6,226,310 | B1 | * | 5/2001  | Takagi et al. ............ 372/50.11 |
| 6,503,768 | B2 | * | 1/2003  | Cho et al. ................ 438/21 |
| 6,542,525 | B1 | * | 4/2003  | Matsumoto et al. ....... 372/26 |
| 7,279,109 | B2 | * | 10/2007 | Stoltz et al. ............. 216/24 |

FOREIGN PATENT DOCUMENTS

| JP | 2002-243964 | 8/2002 |
| JP | 2002-329921 | 11/2002 |
| JP | 2004-349422 | 12/2004 |

* cited by examiner

*Primary Examiner*—Daniel Petkovsek
(74) *Attorney, Agent, or Firm*—Antonelli, Terry, Stout & Kraus, LLP.

(57) ABSTRACT

In the optical integrated devices with ridge waveguide structure based on the conventional technology, there occur such troubles as generation of a recess in a BJ section to easily cause a crystal defect due to the mass transport phenomenon of InP when a butt joint (BJ) is grown, lowering of reliability of the devices, and lowering in a yield in fabrication of devices. In the present invention, a protection layer made of InGaAsP is provided on the BJ section. The layer has high etching selectivity for the InP cladding layer and remains on the BJ section even after mesa etching.

6 Claims, 8 Drawing Sheets

PERSPECTIVE VIEW

FIG.1A

PERSPECTIVE VIEW

FIG.1B

CROSS-SECTIONAL VIEW
TAKEN ALONG LINE A-A'

FIG.1C

CROSS-SECTIONAL VIEW
TAKEN ALONG LINE B-B'

FIG. 2A MQW1 GROWTH

FIG. 2B FORMATION OF BUTT JOINT MASK1

FIG. 2C ETCHING

FIG. 2D BUTT JOINT GROWTH OF MQW2

FIG. 2E BUTT JOINT MASK2 FORMATION AFTER REMOVAL OF MASK1

FIG. 2F ETCHING

FIG. 2G BUTT JOINT GROWTH OF WG

FIG. 2H GROWTH OF UPPER CLAD LAYER AND CONTACT LAYER AFTER REMOVAL OF BUTT JOINT MASK2 AND FORMATION OF DIFFRACTION GRATING

FIG. 2I FORMATION OF MESA MASK

FIG. 2J MESA ETCHING AFTER FORMATION OF MESA MASK

FIG.3A (A-1) AFTER BUTT JOINT GROWTH (A-2) MESA SIDE SECTION AFTER MESA ETCHING

EXAMPLE OF FAULTY RECESS IN BUTT JOINT SECTION

FIG.3B (B-1) AFTER BUTT JOINT GROWTH (B-2) MESA SIDE SECTION AFTER MESA ETCHING

EXAMPLE OF FAULTY INSULATION OF BUTT JOINT SECTION

FIG.4A

PERSPECTIVE VIEW

FIG.4B

CROSS-SECTIONAL VIEW
TAKEN ALONG LINE A-A'

FIG.4C

CROSS-SECTIONAL VIEW
TAKEN ALONG LINE B-B'

FIG.5H'

REFORMATION OF MASK FOR THE BUTT JOINT PROTECTION LAYER AND OTHERS

FIG.5I'

GROWTH OF PROTECTION LAYER AFTER REMOVAL OF InP CAP

FIG.5J'

GROWTH OF UPPER CLAD LAYER AND CONTACT LAYER AFTER REMOVAL OF MASK FOR THE BUTT JOINT PROTECTION LAYER AND FORMATION OF DIFFRACTION LATTICE

FIG.5K'

FORMATION OF MESA MASK

FIG.5L'

MESA ETCHING AFTER FORMATION OF MESA MASK

FIG.6A d : END PORTION OF BUTT JOINT PROTECTION LAYER

SUPPRESSION OF FAULTY
RECESS IN BJ SECTION
(AFTER MESA ETCHING)

FIG.6B

SUPPRESSION OF FAULTY INSULATION
IN BUTT JOINT SECTION
(AFTER MESA ETCHING)

FIG.7A

PERSPECTIVE VIEW

FIG.7B

CROSS-SECTIONAL VIEW TAKEN ALONG LINE A-A'

FIG.7C

CROSS-SECTIONAL VIEW TAKEN ALONG LINE B-B'

FIG.8

OPTICAL INTEGRATED DEVICE AND MANUFACTURING METHOD THEREOF

PRIORITY OF CLAIMS

The present application claims priority from Japanese application No. JP2007-162514, filed on Jun. 20, 2007, the content of which is hereby incorporated by reference into this application.

BACKGROUND OF THE INVENTION

1. Field of the Invention

The present invention relates to an optical integrated device with ridge waveguide structure and a method of fabricating the same.

2. Description of the Related Art

In association with recent explosive increase of Internet users, there are now strong needs for the data transmission at an increasingly higher rate and with increasingly larger capacity, and it is generally considered that the optical communications will play an important role in the communication technology. Especially, in the optical communications for a long distance, the modulator-integrated type of light source, which has the modulator optically connected with the semiconductor laser, is used as an optical transceiver.

In addition, there are strong demands for a high value-added light source such as a tunable light source enabling instantaneous switching of wavelengths to satisfy the needs in the wavelength division multiplex transmission system. In the optical integrated device described above, aside from the active layer (laser section) for emitting optical signals, the different type multi-layer structure area such as a modulator section or a wavelength adjusting section are formed on same substrate. In the process in one of the methods for fabricating such an optical integrated device, the mask is formed on a multi-layer structure first grown, the unnecessary portions are removed by etching, and the different multi-layer structure is regrown. In the optical integrated device, the different type of multi-layer structure area is formed with the optical axis aligned for enabling the high optical coupling efficiency. In general, the regrow process described above is called the butt-joint (BJ).

There are two types of the optical device structures in general; the ridge waveguide structure and buried-hetero (BH) structure. Each of the two types includes advantages and disadvantages, respectively, as described below. In the ridge waveguide structure, the mesa etching is stopped above an active layer, for forming the mesa structure having the thickness of a few micrometers by etching an upper cladding layer. Thus, there is no damage caused to the active layer during mesa etching process. On the other hand, there is the disadvantage that the injected carrier is spread on over the active layer, causing increase of an loss current not contributing to the lasing operation. In the BH structure, the etching is performed on the layer below the active layer for forming the mesa structure, and then, both sides of the mesa structure are buried with the semiconductor layer. The carrier is, thus, efficiently injected into the active layer, and the threshold current is reduced as compared to the laser with ridge waveguide structure. On the other hand, there is the disadvantage in the BH structure that the active layer may be damaged during mesa etching. Especially for the active layer including aluminum, such as the active layer comprising of InGaAlAs materials, a specific treatment may be required for the side wall of active layer before the buried growth. The adoption of either structure may be allowable, depending on the device application. The optical device according to the present invention provides the improved optical device adopting the ridge waveguide structure.

Figure 1A:
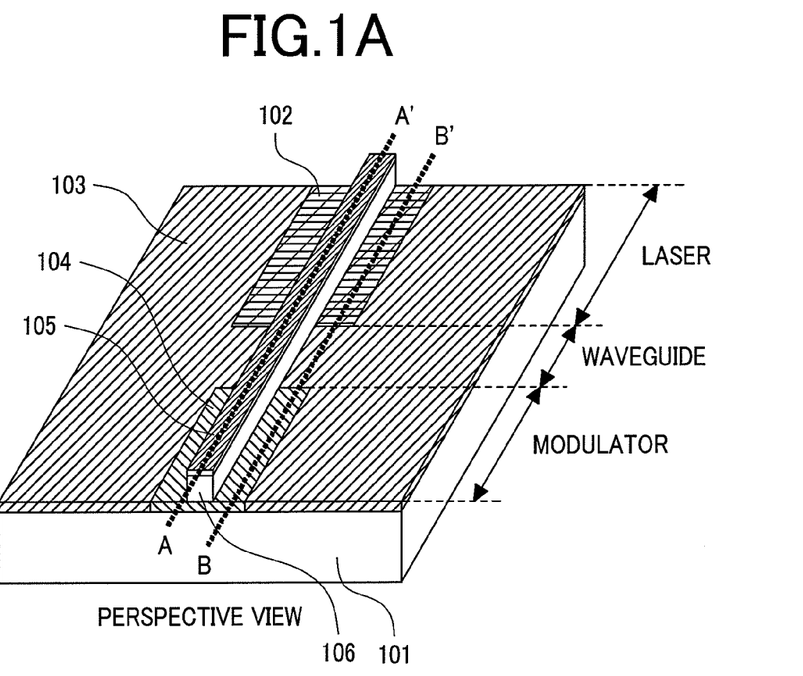
FIG. 1A is a perspective view illustrating the modulator-integrated laser based on the conventional technology.

The conventional technology is described below with reference to the modulator-integrated light source with ridge waveguide structure as an example. FIG. 1A is a perspective view illustrating a device. In FIG. 1, reference numeral 101 denotes an n-InP substrate; 102, a multiple quantum well (MQW1) layer in the laser section; 103, the waveguide(WG) layer in the waveguide section; 104, the MQW2 layer in the modulator section; 105, a $p^+$-InGaAs contant layer; and 106, a p-InP cladding layer. A diffraction grating 107 is formed in the laser section. A optical window section and electrodes are omitted from FIG. 1 for simplification.

Figure 1B:
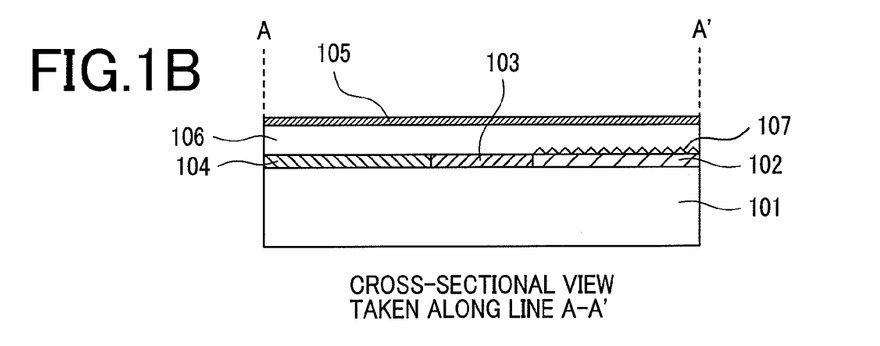
FIG. 1B is a cross-sectional view of the modulator-integrated laser.
Figure 1C:
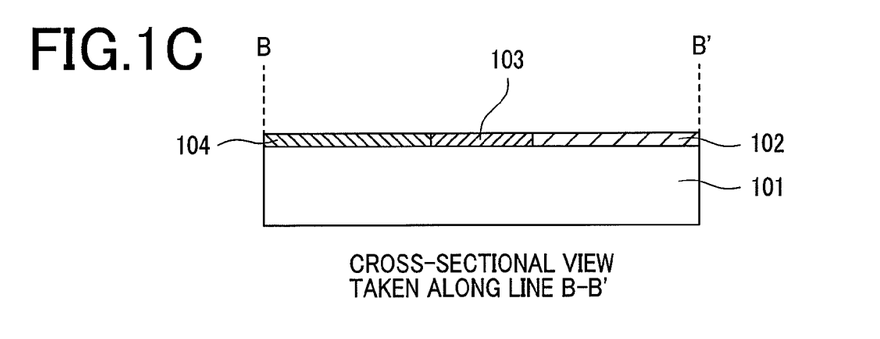
FIG. 1C is another cross-sectional view of the modulator-integrated laser.

A semiconductor material such as InGaAsP or InGaAlAs is generally used as a material for the laser section or the modulator section. FIG. 1B is a cross-sectional view of a mesa A-A' section. A diffraction grating is formed in the laser section, and the p-InP cladding layer 106 and the $p^+$-InGaAs contact layer 105 are formed on the entire surface of the MQW layer and the WG layers that are connected to each other by BJ. FIG. 1C is a cross-sectional view of the mesa side B-B' section. The mesa etching is stopped on the MQW layers 102 and 104 as well as on the WG layer 103 each having the high etching selectivity for InP. As described above, in the ridge waveguide structure type of devices, it is important to reduce a loss current for improving the device performance. Therefore, by stopping mesa etching just above the MQW layer, spread of an injected carrier is suppressed at minimum to enable lasing operation with a lower threshold current. In the final form of the device as described above, the BJ section is exposed in a portion of the device at the side region of mesa.

FIG. 2 is a view illustrating a flow of fabrication of the device shown in FIG. 1. At first, in the step (a), the MQW1 layer 203 in the laser section is grown on the n-InP substrate 201. In this step, the p-InP cap layer 202 is formed for protection of the surface in most cases. Then in step (b), a BJ mask1 204 is formed at a desired portion of a wafer. As a material of the mask, generally an insulating material such as $SiO_2$ or SiN is used. In step (C), the p-InP cap layer 202 and the MQW 1 layer 203 are removed by using the BJ mask1 204 as an etching mask.

In step (d), the MQW2 layer 206 in the modulator section and the p-InP cap layer 205 are regrown. In this step, the MQW1 layer and the MQW2 layer are temporary butt-jointed. In step (e), after removing the mask1 204, the BJ mask2 207 are formed at desired positions of the laser section and the modulator section. In step (f), the p-InP cap layers 202 and 205, the MQW1 layer 203, and the MQW2 layer 206 are removed by etching using the BJ mask2 207 as an etching mask. Furthermore, in step (g), the WG layer 209 and the p-InP cap layer 208, were regrown. Then, the laser section, the waveguide section, and the modulator section are optically connected. In step (g), the WG section was butt-jointed to both the laser section and the modulator section concurrently. As described above, the laser section and the module section are temporary connected in step (d), and a transition region of a narrow band gap is formed near the mask because of the selective area growth effect in re-growing the MQW2 layer, which causes an optical absorption loss. The WG layer is, thus, introduced for removing the transition region. This is important for realizing a high performance of the optical device.

Figure 2A:
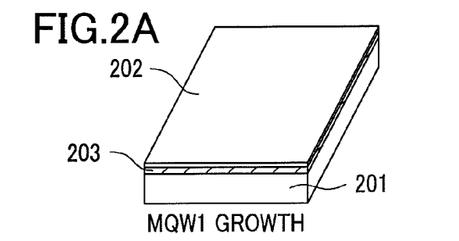
FIG. 2A to FIG. 2J are views illustrating a flow of fabrication of the modulator-integrated laser based on the conventional technology.
Figure 2B:
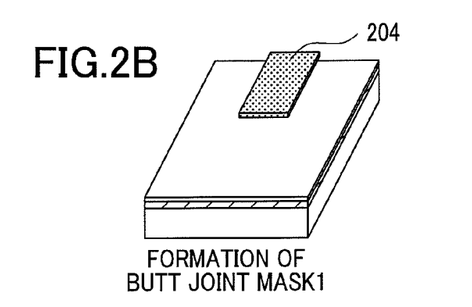
Figure 2C:
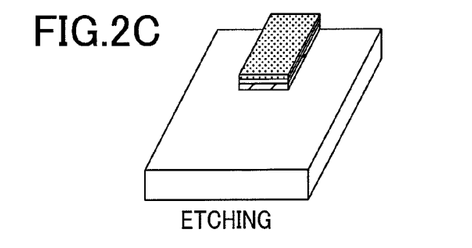
Figure 2D:
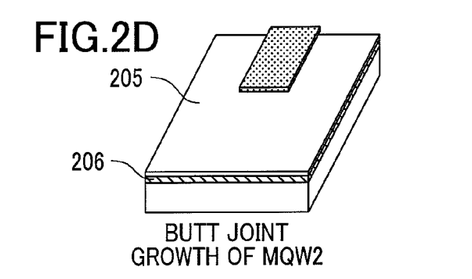
Figure 2E:
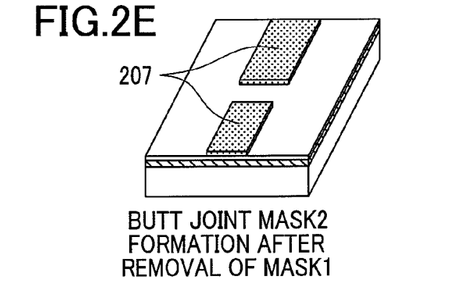
Figure 2F:
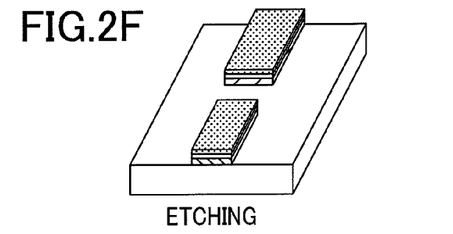
Figure 2G:
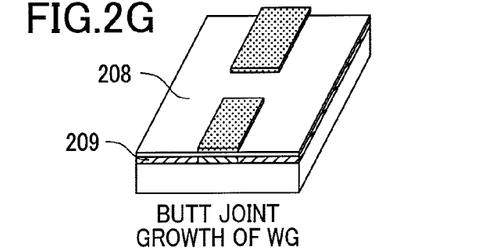
Figure 2H:
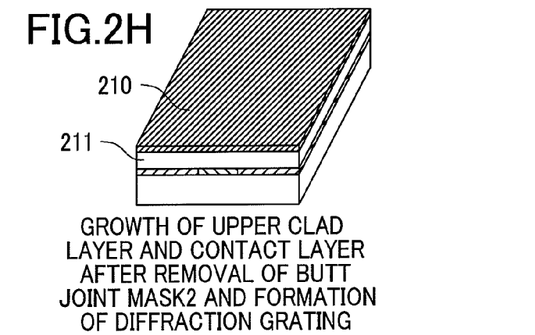
Figure 2I:
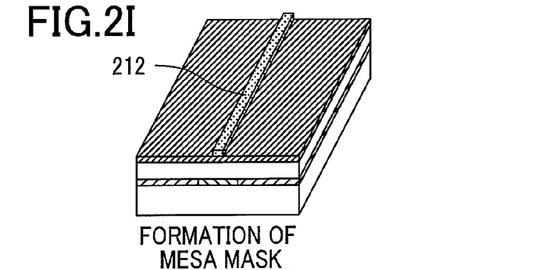
Figure 2J:
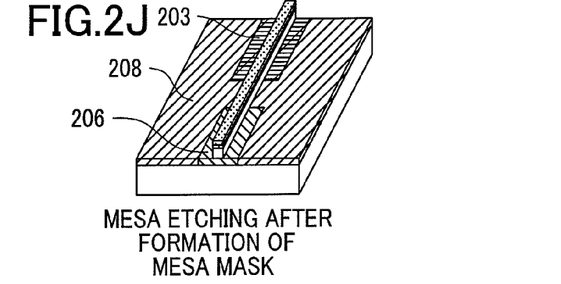

In step (h), after removing the mask 207 and forming a diffraction grating in the laser section, the p-InP cladding layer 211 and the $p^+$-InGaAs contact layer 210 are grown in the whole area of the wafer. In step (i), the mesa mask 212 is formed. As the final step (j), the p+-InGaAs contact layer 210 and the p-InP cladding layer 211 are successively removed by etching in order to form a mesa stripe. The etching is stopped at the MQW1 layer, the MQW2 layer, and the WG layer comprising semiconductor materials including As. As a final form of the optical device, the surfaces of the BJ-connected portions are exposed at the portion in which the p-InP cladding layer is removed. Subsequently, by using the usual method, the device is completed by forming a passivated layer, and planarizing polyimide, and forming electrodes.

SUMMARY OF THE INVENTION

Figure 3A:
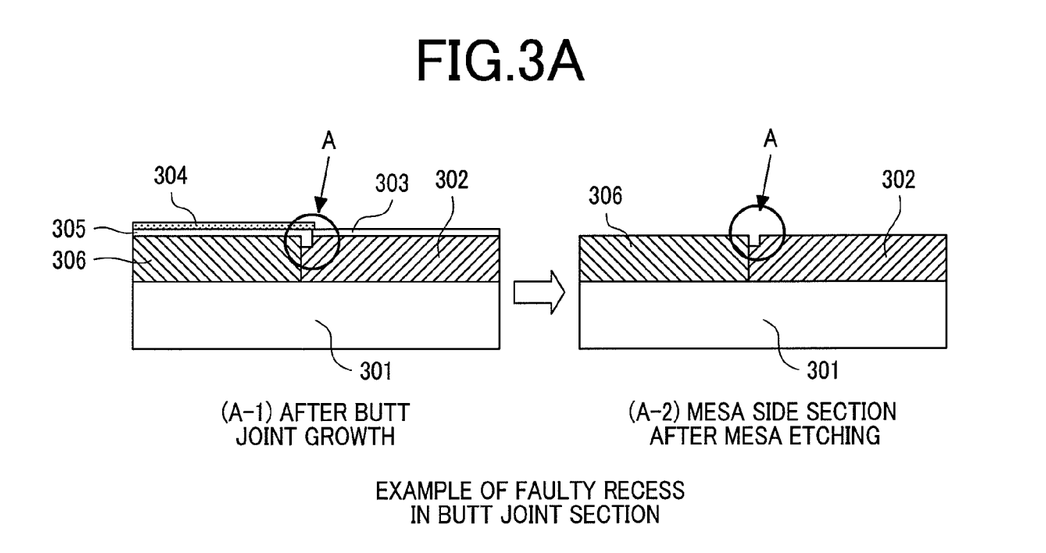
FIG. 3A and FIG. 3B are views illustrating problems in the BJ integrated device based on the conventional technology.
Figure 3B:
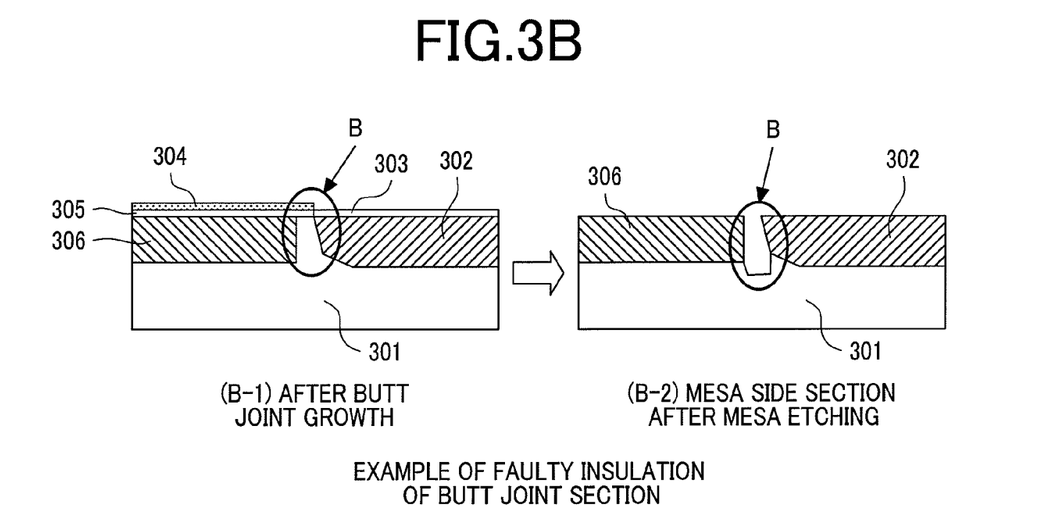

Next, description is provided for the problems when a optical integrated device with ridge waveguide structure is fabricated by using BJ technique. The details are shown in FIG. 3. In FIG. 3, reference numeral 301 denotes an InP substrate; 302, a WG layer; 303, an InP cap layer; 304, an BJ mask; 305, an InP cap layer; and 306, an MQW layer.

A first problem is generation of a crystal defect due to a recess in a BJ joint section. Different from the growth on a flat substrate, BJ regrowth is specific one into the MQW side wall section, and specific technique is required for realizing smooth connection around the joint portion. In the invention described in Patent document 1 (JP-A-2002-243964), by performing appropriate side etching to a portion below a mask prior to BJ regrowth, the selective area growth effect from the mask is suppressed and smooth connection at the joint portion is obtained.

After the side etching, the MQW portion is set back from the mask edge. BJ regrowth is usually carried out at a substrate temperature in the range from 550 to about 700° C. When the substrate temperature is raised to the desired growth temperature, the InP cap layer beneath the mask may hang down due to mass transport of In atoms. As a result, after growth of BJ, the form at BJ interface becomes like that of a section A in FIG. 3A-1. When the device having the form as described above is fabricated according to the flow shown in FIG. 2, a recess is generated in the section A after the mesa etching in which the p-InP cladding layer was removed (shown in FIG. 2J). The crystal quality at recessed portion is insufficient, and crystal defects are easily generated. Although the recessed portion where the cladding layer is removed does not actually use as a device region, a injected current from the mesa section extends with a distance of several micrometers and flows also to the recessed portion (the section A) at the side of the mesa where there is no cladding layer. If there is a crystal defect which may function as defect species, the crystal defects increase rapidly and reach up to a device region of the mesa section, which causes degradation of the device performance.

A second problem is disconnection of the BJ section after mesa etching. During the substrate temperature rise as described above, in addition to hanging down of the InP cap layer, there also occurs the phenomenon that lower InP layer creeps up. The problem is also pointed out in Patent document 2 (JP-A-2004-349422). This phenomenon occurs also due to mass transport by In atoms. Because mass transport of In atoms occurs from both upper and lower InP layers, after BJ regrowth, the InP is sandwiched between a WG layer and an MQW layer at the BJ portion as shown in a section B in FIG. 3B-1. When the device as described above is fabricated according to the flow shown in FIG. 2, after the mesa etching process shown in FIG. 2J, the InP portion in the section B shown in FIG. 3B-2 is etched and the BJ section is resulted to be disconnected. Since etching proceeds also in the lateral direction, the etching front easily reaches from a side of mesa to a portion below the mesa. In this case, the device does not work normally, a yield of the fabrication process of devices is lowered.

The present invention can solve the problems which are caused in the BJ section and are specific to the optical integrated device with ridge waveguide structure as described above.

To solve the problems as described above, the inventors devised the device structure as described below. Specifically, the present invention provides an optical integrated device with ridge waveguide structure formed on a semiconductor substrate and having a optical waveguide region in which two optical waveguides, namely a first optical waveguide layer and a second optical waveguide layer are butt-jointed at least at one position, and cladding layers positioned above and under the optical waveguide region for confining the light therein, and a first protection layer is formed overriding the butt joint section between the first optical waveguide layer and the second optical waveguide layer, and the first protection layer covers a portion or all of the butt joint section in the region in which the upper cladding layer is removed for forming a mesa structure. For fabricating the device, the present invention also provides the method of fabricating.

The method of fabricating comprises the following steps at least once and at least at one position in the device. The steps comprise of:

forming the first optical waveguide layer on a semiconductor substrate;

patterning a region in which a first semiconductor device is to be formed by removing extra part of the first optical waveguide layer by using a first etching mask formed on the first optical waveguide layer;

connecting the second optical waveguide layer to the first optical waveguide layer on a semiconductor substrate by using the butt-joint regrowth;

forming the mask for the first protection layer in which the butt-joint portion between the first and the second optical waveguide layers is exposed and an edge portion of the mask for the first protection layer is inside an edge portion of the first etching mask after removing the first etching mask;

forming the first protection layer selectively on a semiconductor substrate by using the mask for the first protection layer;

forming a first semiconductor layer including an upper cladding layer and a contact layer after removing the mask for the first protection layer;

and forming a mesa structure on the first and the second optical waveguide layers as well as on the first protective layer by removing extra part of the first semiconductor layer by etching until the first optical waveguide layer, the second optical waveguide layer and the first protection layer are exposed.

Figure 4A:
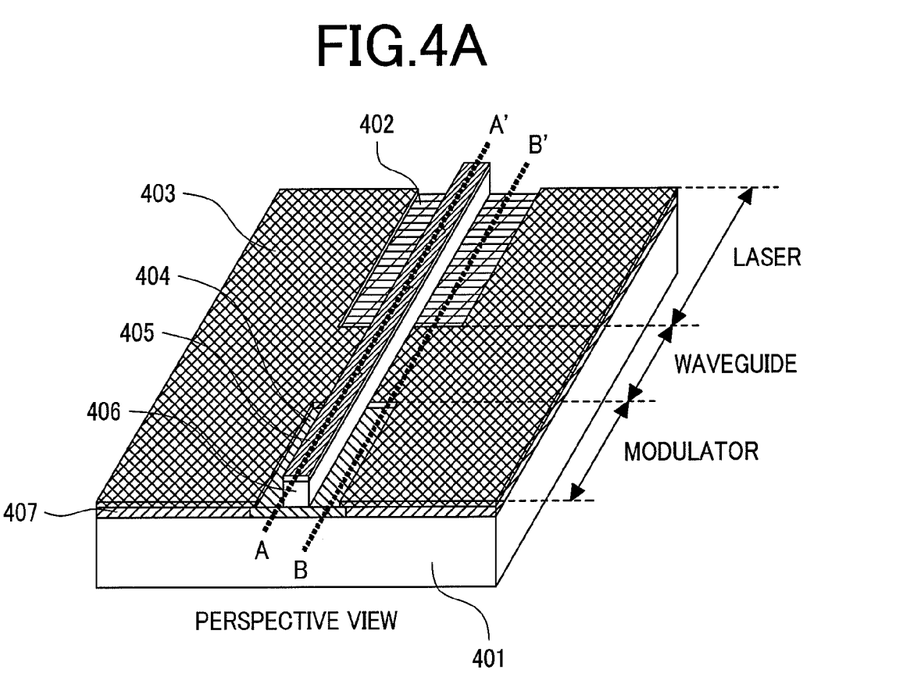
FIG. 4A is a perspective view illustrating the modulator-integrated laser according to the present invention.

FIG. 4 illustrates a light source in which the optical integrated device with ridge waveguide structure according to the present invention is used. FIG. 4A illustrates a perspective view of the device. In FIG. 4A, reference numeral 401 denotes an n-InP substrate; 402, an MQW1 layer in the laser section; 403, a BJ protection layer corresponding to the first protective layer; 404, an MQW2 layer in the optical modulator; 405, an p+-InGaAs contact layer; 406, a p-InP cladding layer; and 407, a WG layer. A diffraction grating 408 is formed in the laser section. It is to be noted that an optical window section and electrodes are omitted for simplification of the figure. As understood from this figure, except for the main portion of the laser section and the modulator section, the entire surface of the device including the BJ portion is covered with the BJ protection layer 403.

Figure 4B:
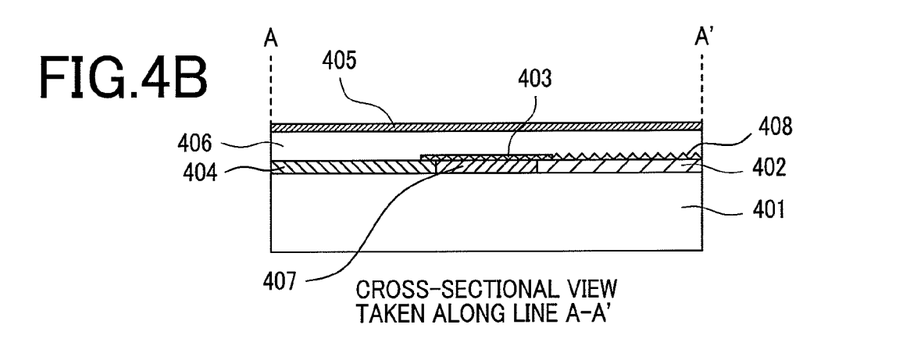
FIG. 4B is a cross-sectional view of the modulator-integrated laser.
Figure 4C:
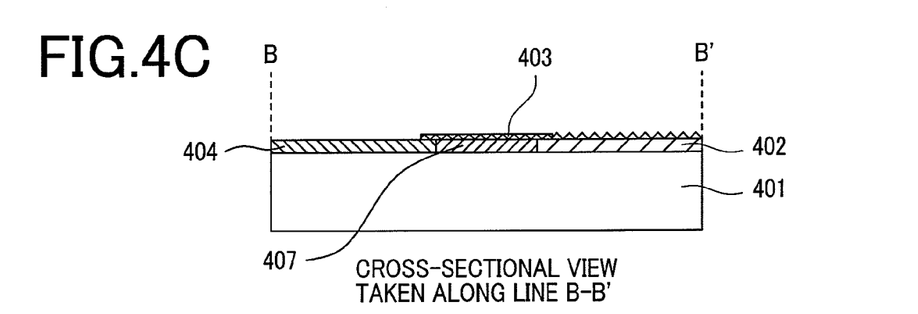
FIG. 4C is another cross-sectional view of the modulator-integrated laser.
Figure 5H:
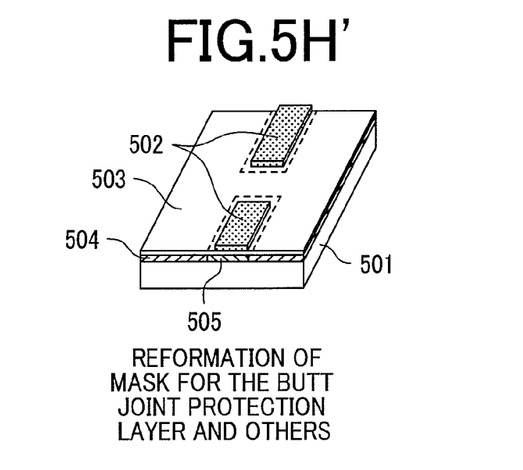
FIGS. 5H' to 5L' are views illustrating a flow of fabrication of the modulator-integrated optical integrated device according to the present invention.
Figure 5I:
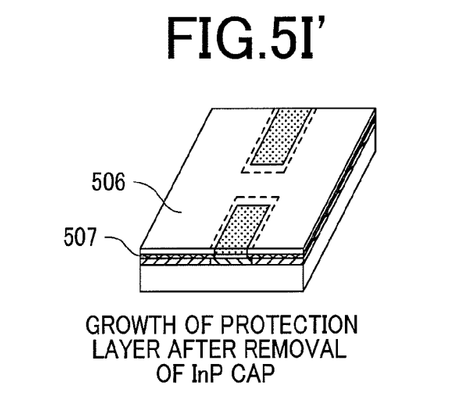
Figure 5J:
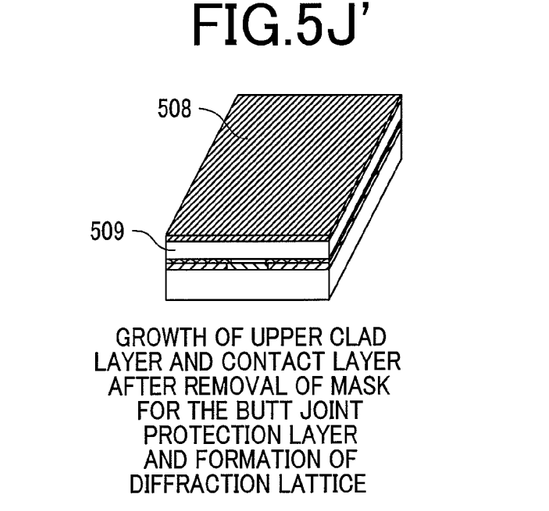
Figure 5K:
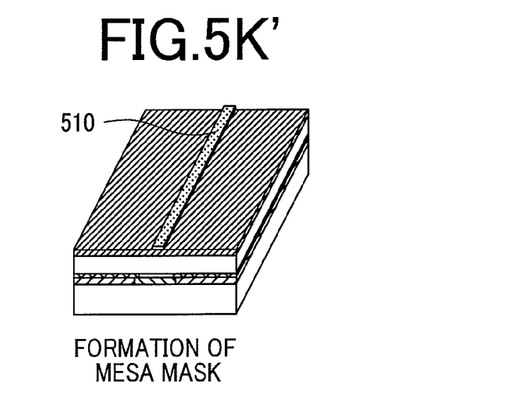
Figure 5L:
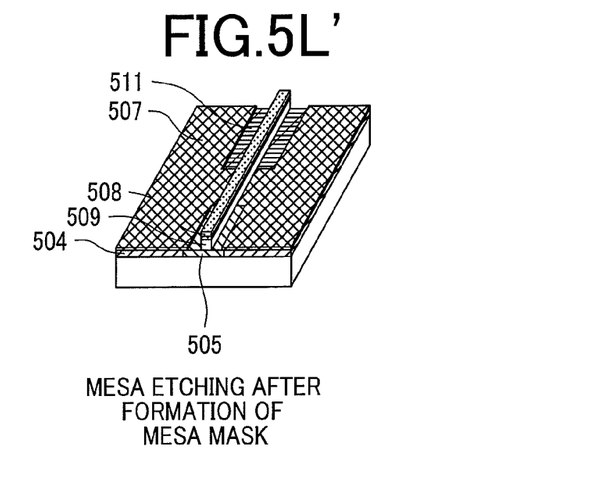

FIG. 4B is a cross-sectional view of the mesa A-A' section, while FIG. 4C is a cross-sectional view illustrating the mesa side B-B' section. It is understood from this view that the BJ protection layer 403 extends over the BJ portion up to a portion of laser section and a portion of the modulator section. The BJ protection layer is most preferably made of an InGaAsP-based semiconductor material which has the high selectivity for InP in the etching, and the mesa etching can be stopped on the MQW1 layer 402, MQW2 layer 404, and the BJ protection layer 403. In the final form of the device according to the present invention, the BJ portion is covered with the BJ protection layer 403, and is not exposed to outside like in the device based on the conventional technology. A thickness of the BJ protection layer 403 is required only to be in the range from several nm to several tens nm. As described above, the semiconductor material used for the BJ protection layer is similar to that used for the WG layer, and therefore the optical loss is very low when light is propagated in the WG layer. A current is not injected in the WG layer, and therefore the performance is little affected by the fact that the BJ protection layer is formed on the waveguide layer.

In Patent document 3 (JP-A-2002-329921), to reduce scatter of light at the BJ portion, the layer for reducing the thickness difference at the BJ portion is formed on the entire surface of the device. The device has BH structure. In this structure, the layer for reducing the thickness difference is unnecessarily formed on the MQW layer in the device section, there are concerns that the optimal design of the device is prevented and the spread of an injection current is enhanced. As a result, the device performance may be degraded. On the other hand, by using the fabricating method according to the present invention, the design of structures of the MQW layers in the laser section and the optical modulator section are kept optimal because the increase of loss current does not occur. This is because a main portion of the laser section and the modulator section is not covered with the BJ protection layer in the present invention. Because of the features as described above, by using the fabricating method according to the present invention, device with high reliability can be fabricated with a high yield in fabrication of device.

FIG. 5 is a flow of fabricating the device shown in FIG. 4. Steps (a) to (g) are common to those shown in FIG. 2, and the subsequent steps are described as steps (h') to (l'). After the steps (a) to (g) are performed, a form of the mask for the BJ protection layer, for instance, in step (h') is as shown in FIG. 5 (h'). As an example of the simplest method of forming a mask, for instance, after completion of the step (j), the mask is once removed, and the new mask can again be formed. Alternatively, the method can be conceivable in which the mask formed in step (j) is re-used. In this figure, reference numeral 501 denotes an InP substrate; 502, mask for the BJ protection layer; 503, the InP cap layer; 504, a waveguide layer; 505, a MQW1 layer in the modulator section. Then in step (I'), the InP cap 503 is removed, and then the BJ protection layer 507 and the InP cap layer 506 are successively grown. For a method of removing the InP layer 503, it is allowable to employ the normally wet etching, or In-situ etching by flowing a halogen-based gas just before growth of the BJ protection layer in the crystal growth furnace. When the in-situ etching is employed, the process is performed in a vacuum furnace, and therefore contamination of impurities on a regrown surface can be prevented. In step (j'), after forming a diffraction grating on the MQW2 layer in the laser section 511, a p-InP cladding layer 509 and a p$^+$-InGaAs layer 508 are successively grown on the entire surface of the device. In step (k'), a stripe-like mesa mask 510 is formed. Finally, in step (l'), a mesa is formed by etching the p$^+$-InGaAs contact layer 508 and the p-InP cladding layer 509 in this order. Etching of the p-InP cladding layer 509 is substantially stopped at the MQW1 layer 505, MQW2 layer 511 and the BJ protection layer 507 which are made of a semiconductor material including As atoms. As a result, in the final form of the device, the BJ portion in the region where the p-InP clad 509 has been removed is completely covered with the BJ protection layer 507. Subsequently, by using the usual method, the device is completed by forming a passivated film, and planarizing polyimide, and forming electrodes.

Figure 6A:
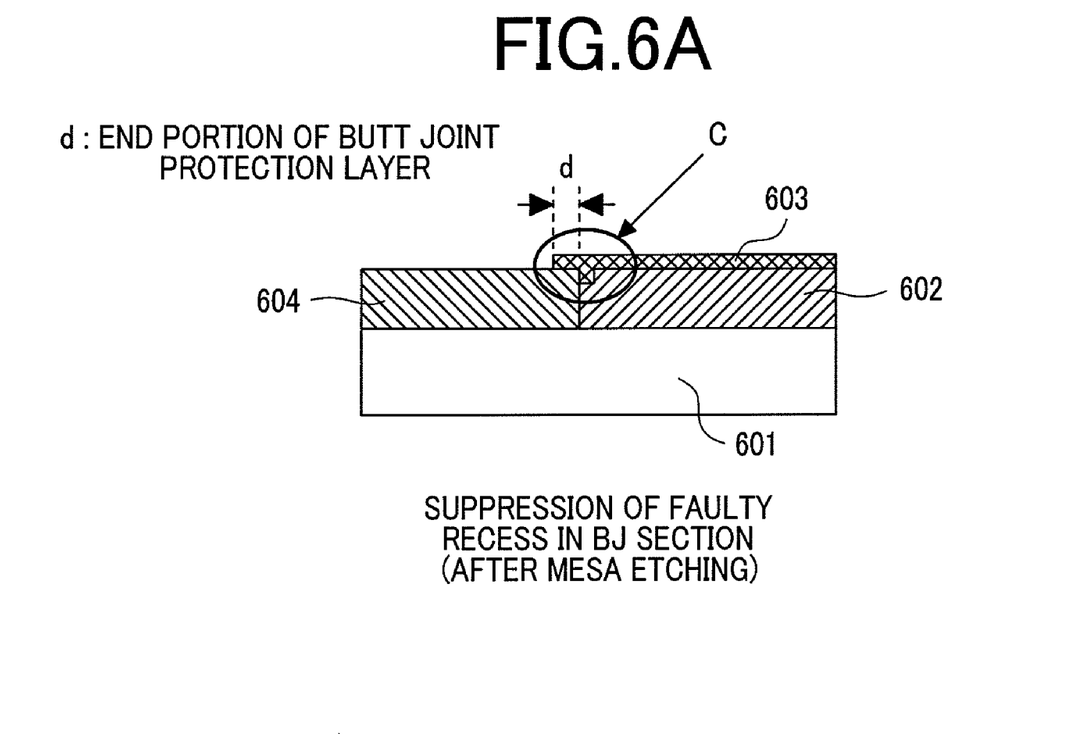
FIG. 6 is a view illustrating the effects provided by the present invention.
Figure 6B:
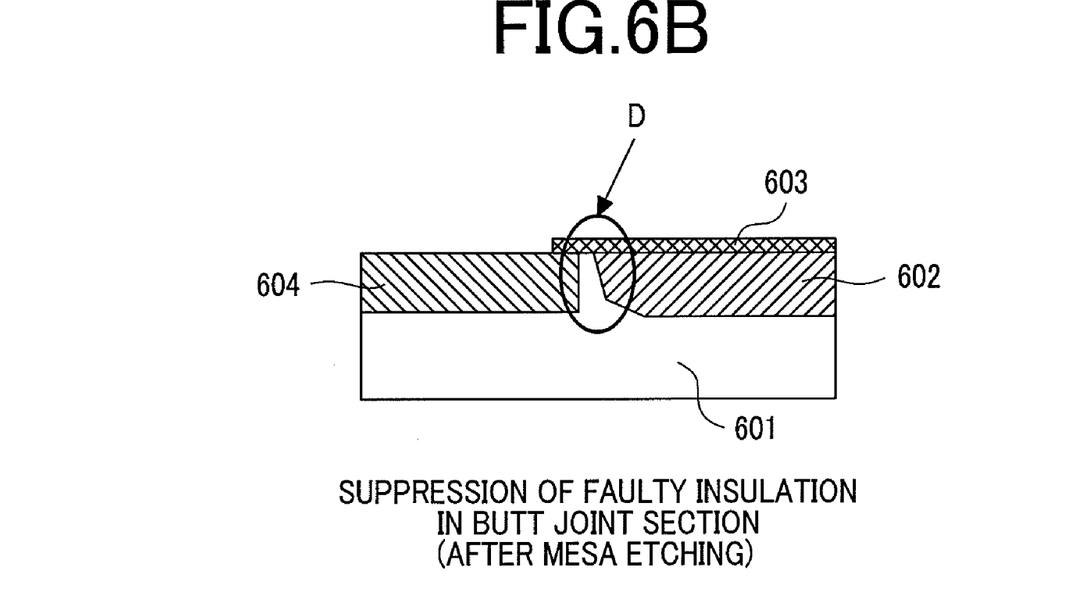

Effects of the present invention are described below. FIG. 6 is a cross-sectional view illustrating a BJ portion after mesa etching. In FIG. 6, reference numeral 601 denotes an InP substrate; 602, a WG layer; 603, a BJ protection layer; and 604, a MQW layer. The InGaAsP-based material is preferably used for forming the BJ protection layer. At first, the effect provided for solving the problem caused by the recess formed after BJ re-growth shown in FIG. 6A is described. The InGaAsP-based material formed on InP substrate usually has an In content of about 50% or more, so that mass transport easily occurs, and as shown in the section C shown in FIG. 6A, the recess in the BJ section can easily be buried. This material is hardly affected by oxidation, and therefore even when the material is exposed to the air for a long period, the crystal defects are hard to generate and to increase. Therefore, after formation of a mesa, owing to the BJ protection layer, even if a current flows in, generation of the crystal defects due to the BJ portion can be suppressed, and reliability of the device, thus, can be improved. Next, the effect for solving the problem caused by disconnection at BJ portion is described with reference to FIG. 6B. As described above, the InGaAsP-based material has the high etching selectivity for InP. Because of the feature, even if InP is sandwiched between a WG layer and an MQW layer at the BJ portion, because the top portion is covered with the BJ protection layer 603 as shown in the section D in FIG. 6D, the InP layer beneath the BJ protection layer 603 is prevented to etch during mesa etching process, which improves a yield of device fabrication.

As shown in FIG. 6A, an edge (d) of the BJ protection layer in the MQW section is preferably at the distance from 0.01 μm to 10 μm from the BJ portion. When the InP layer is sandwiched between a WG layer and an MQW layer at the BJ portion, d must be set to the value described above by subtracting the width of the InP layer described above. The lower limit value of 0.01 μm is decided by taking into consideration the excessive etching time in mesa etching. Although a etching solution used for etching the InP cladding layer has extremely high selectivity for the InGaAsP layer, the InGaAsP layer is slightly etched. Generally, in etching process, to suppress the remain of not-etched portions, etching is performed for an excessive period of time. In this step, sometimes the BJ protection layer is, thus, slightly etched in the both vertical and lateral directions, so that a margin of 0.01 μm from the BJ portion is necessary to prevent the expose of the BJ portion due to excessive mesa etching. On the other hand, the upper limit value of 10 μm is provided for preventing increase of an loss current not contributing to the lasing operation due to the spread of injected carrier. When an electrode is formed on MQW region without the BJ protection layer to suppress the spread of the injection current, if the distance from the BJ portion is within 10 μm, the injection current extends to the MQW section under the BJ protection layer, and the entire section of the MQW layer can be made to contribute as a device region.

Because of the features as described above, when the fabrication method according to the present invention, it is possible to overcome the problems in the conventional technology and also to fabricate highly reliable devices with a high yield of fabrication. The BJ protection layer is required at least to be formed overriding the BJ portion around the mesa side portion, and is not always required to have the completely same form as that shown in FIG. 4, and the effects of the present invention can be obtained in the form that a part of the BJ protection layer is removed.

In the fabrication method according to the present invention, a protection layer is provided on BJ in an optical integrated device with ridge waveguide structure based on the BJ technique. Because of the feature, it is possible to solve the problems as lowering of reliability of devices or lowering of the yield of device fabrication originated from BJ portion. As a result, the optimal device structure can be fabricated.

DETAILED DESCRIPTION OF THE PREFERRED EMBODIMENTS

Figure 7A:
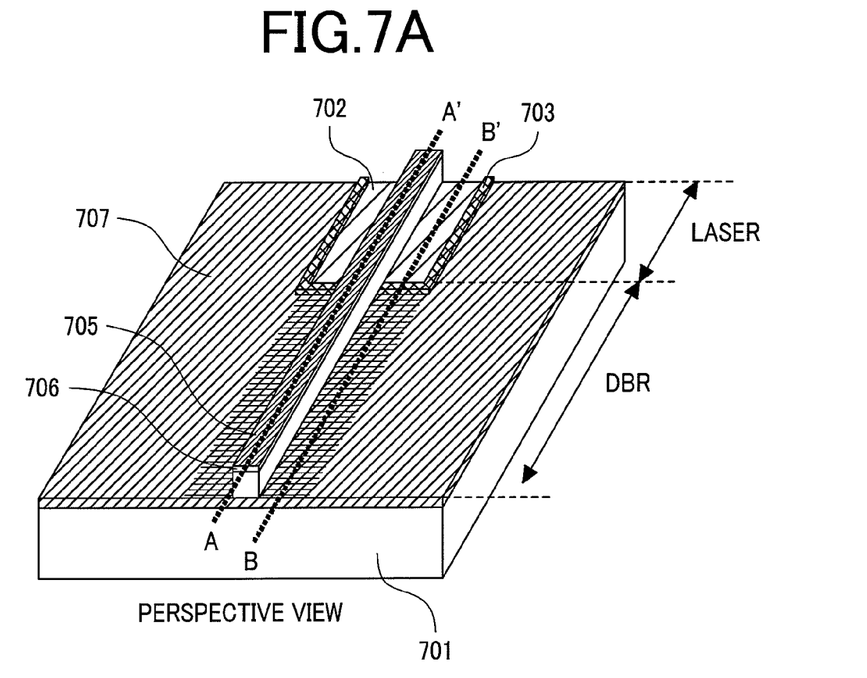
FIG. 7A is a perspective view illustrating the short cavity Distributed Bragg Reflector (DBR) laser according to the present invention.
Figure 7B:
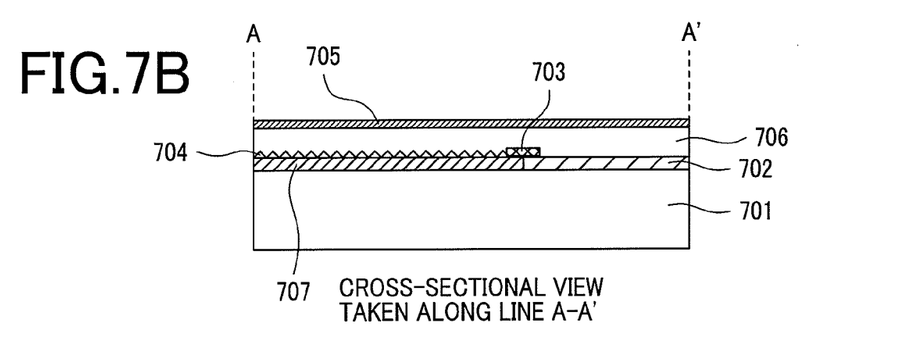
FIG. 7B is a cross-sectional view of the short cavity DBR laser.
Figure 7C:
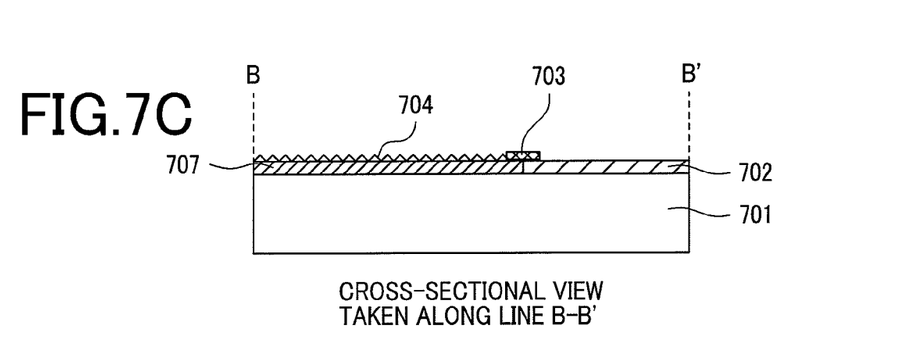
FIG. 7C is another cross-sectional view of the short cavity DBR laser.
Figure 8:
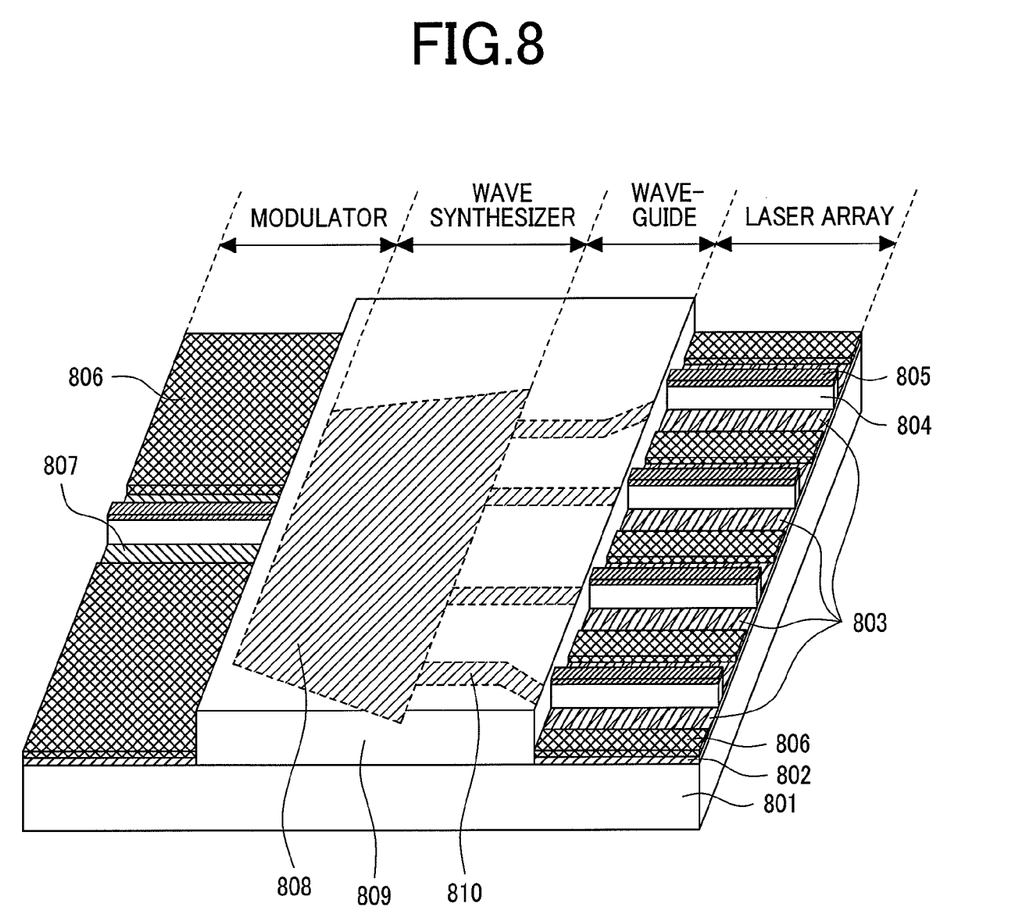
FIG. 8 is a perspective view illustrating the modulator-integrated 4-channel laser array device according to the present invention.

Embodiments of the present invention are described below with reference to FIG. 4, FIG. 7, and FIG. 8.

First Embodiment

In a first embodiment of the present invention, the present invention is applied to the modulator-integrated laser with ridge waveguide structured as described above. As the growth method, the metal-organic vapor phase epitaxy (MOVPE) is used. As source materials which supply the group III elements, triethyl garium (TEG), trimethyl indium (TMI), and trimethyl aluminum (TMA) are used. As source materials which supply the group V elements, arsine ($AsH_3$) and phosphine ($PH_3$) are used. As a source material for n-type dopant, disilane ($Si_2H_6$) is used, and as a source material for p-type dopant, dimethyl zinc (DMZ) is used. The growth method is not restricted to the MOVPE method, and it is allowable to employ any other method including the molecular beam epitaxy (MBE) method, the chemical beam epitaxy (CBE) method, the metal-organic molecular bean epitaxy (MO-MBE) method.

FIG. 4A is a perspective view of the device. In this figure, a optical window section and electrodes are omitted for simplification. A flow of fabricating the device is as shown in FIG. 2A to FIG. 2G as well as in FIG. 5H' to FIG. 5L'. At first, an MQW1 layer in the laser section 402 made of an InGaAlAs-based material is formed on an n-InP substrate 401. In this step, for protection of the surface, a p-InP cap layer is formed in most cases. Then a BJ mask1 is formed at a desired portion of the wafer, and extra part of the p-InP layer and the InGaAlAs MQW1 layer 402 are removed using the BJ mask1 as an etching mask. Then, the wafer is introduced into a growth furnace, and an MQW2 layer in the modulator section made of an InGaAlAs-based material 404 and the p-InP cap layer are regrown.

Then the BJ mask1 formed as described above is removed, and BJ masks2 are formed at desired position on the laser section and the modulator section, and extra parts of the MQW1 layer 401, MQW2 layer 404, and p-InP cap layer are removed by etching. Furthermore, a WG layer 407 made of an InGaAsP-based material and a p-InP layer are regrown. In this step, Each of MQW1 layer in the laser section 401 and MQW2 layer in the modulator section 404 is BJ-connected to the WG layer 407 simultaneously. The wafer is once taken out from the growth furnace, the BJ mask2 is removed once, and then a mask for the protection layer is formed in the inner side of the region where the previous BJ mask2 was present.

The wafer is again introduced into the furnace for re-growth, and after the p-InP layer is removed with a gas containing chlorine, the BJ protection layer 403 made of the same InGaAsP having the same composition as that for the WG layer 407 and the p-InP layer are successively grown. After the wafer is taken out from the growth furnace, the mask for the protection layer is removed, and a diffraction grating 408 is formed on the MQW1 layer 402 in the laser section.

Then, the wafer is introduced into the furnace to growth the p-InP cladding layer 406 and the $p^+$-InGaAs contact layer 405 are grown, and then the crystal growth process comes to the end. Then a stripe-like mesa mask is formed. In succession, the $p^+$-InGaAs contact layer 405 and the p-InP cladding layer 406 are removed in this order by etching to form a mesa. Subsequently, by using the usual method, the device is completed by forming a passivated film, and planarizing polyimide, and forming electrodes.

The threshold current for the device fabricated as described above was 15 mA, and the device shows the excellent modulation performance of 10 GHz without the thermal electric cooler at the temperature in the range from 20 to 85 degrees C., and the device performance is not degraded even when the device is used for a long period of time, which indicates high reliability of the device. In addition a yield in fabrication of devices is high.

It is possible to use not only the InGaAlAs-based material described above, but also the InGaAsP-based material, or materials containing Sb or N atoms.

Second Embodiment

In a second embodiment of the present invention, the present invention is applied to a short cavity Distributed Bragg Reflector (DBR) laser. This laser is novel light source in which a cavity length is extremely short and a high speed operation is possible with a low threshold current as described in the report by Aoki et al, 7p-ZN-18, page 1016 of Collection of 66-th Assembly of Draft Report for Symposium of Applied Physics. The MOVPE method is used as a growth method also in this embodiment, but the growth method is not restricted to the MOVPE method, and any other method may be employed so long as the same effect is provided. The source materials used in the second embodiment are the same as those used in the first embodiment. FIG. 7A is a perspective view of the device. In FIG. 7A, the optical window section and the electrodes are omitted for simplification. The flow of fabricating the device is similar to that in the first embodiment. At first, MQW layer in the laser section 702 made of an InGaAlAs-based material is grown on an n-InP layer 701. In this step, for protection of a surface thereof, a p-InP cap layer is formed in most cases. Then a BJ mask is formed at a desired portion of a wafer, and extra parts of the p-InP cap layer and MQW layer in the laser section 702 are removed by using the BJ mask as an etching mask.

Then, the wafer is introduced into the growth furnace to form a WG layer 707 made of an InGaAsP-based material. In the second embodiment, BJ connection is provided only at one part in the laser section. The wafer is taken out from the furnace once, and the BJ mask is removed once and a mask for the protection layer was formed where the BJ portion is exposed to the air Then, the wafer is again introduced into the growth furnace, and the p-InP cap layer is removed by using a gas containing chlorine. Then a BJ protection layer 703 made of InGaAsP and a p-InP layer are formed to override the BJ portion. After the wafer is taken out from the growth furnace, the mask for the protection layer is removed, and a diffraction grating 704 is formed on the WG layer 707.

Then, the wafer is introduced into the furnace to grow a p-InP cladding layer 706 and a p$^+$-InGaAs contact layer 705, thus the crystal growth process coming to the end. Then a stripe-like mesa mask is formed. Then the p$^+$-InGaAs contact layer 705 and the p-InP cladding layer 706 are removed in this order by etching to form a mesa. Subsequently, by using the usual method, the device is completed by forming a passivated film, and planarizing polyimide, and forming electrodes.

In the device, a length of the laser cavity is 50 μm, and a length of the device is 200 μm. The device operates with threshold current of 10 mA and at a high modulation frequency of 10 GHz at the temperature of 100 degrees C. Even when the device is used for a long time, the device performance is not degraded, indicating high reliability of the device. In addition, the yield in fabrication of devices is high.

Third Embodiment

In a third embodiment of the present invention, the present invention is applied to an arrayed optical integrated device. FIG. 8 is a perspective view illustrating the device. In FIG. 8, the optical window section and the electrodes are omitted for simplification. This device is an example of a device in which laser beam emitted from the one laser among four-channel lasers arrayed in parallel and is guided to the modulator section by a optical multiplexer via a waveguide and is modulated by modulator. In FIG. 8, reference numeral 803 denotes an MQW1 layer in the laser section; and 807, an MQW2 layer in the modulator section. The MQW1 layer in the laser section 803 and the MQW2 layer in the modulator section 807 are connected with an optical multiplexer 808 and a waveguide 810. In the third embodiment, the MOVPE method is employed as a growth method, but the growth method is not restricted to the MOVPE method, and any other method may be employed so long as the same effect can be achieved. The ferrocene is used as source material for iron in this embodiment in addition to those used in the first embodiment.

At first, MQW1 layer in the laser section 803 made of InGaAsP-based material is grown on an n-InP substrate 801. In this step, for protection of a surface, the p-InP layer is formed in most cases. Then a BJ mask is formed at a desired position on the wafer, and extra part of the p-InP cap layer and an InGaAsP-MQW1 layer 803 are removed by etching using the BJ mask as an etching mask. Since there are four channels of lasers, it is necessary to form masks at four positions. Then, the wafer is introduced into a growth furnace, and an MQW2 layer in the modulator section 807 made of an InGaAsP-based material and the p-InP cap layer are regrown. Then, after the previous BJ masks are removed, and BJ masks are formed again at desired positions on the laser section and the modulator section, and extra part of the MQW1 layers, MQW2 layer and the p-InP cap layer are removed by etching. Further, the WG layer 802 and the p-InP cap layer are regrown successively by using BJ technique. In this embodiment, five sections, namely the four channels of lasers and one modulator, are BJ-connected simultaneously.

The wafer is once taken out from the furnace, and also the mask is once removed, and then a mask for the protection layer is formed in the side inner region where the removed mask was present. After the p-InP cap layer is removed by wet etching using the mask for the protection layer as an etching mask, the wafer is again introduced into the growth furnace to grow the BJ protection layer 806 made of InGaAsP having the same composition as that for the WG layer 802 and the p-InP cap layer. The wafer is taken out from the furnace and the mask is removed, and a diffraction grating is formed on the four MQW1 layers in the laser section 803. Then, the wafer is introduced into the furnace to grow a p-InP cladding layer 804 and a p$^+$-InGaAs contact layer 805.

Next, to form a waveguide 810 and an optical multiplexer 808, entire surfaces of the laser section and the modulator section are covered with a mask. In the exposed region, p$^+$-InGaAs contact layer 805 is removed, and then a BH mask having the shape as indicated by a dotted line in FIG. 8 is formed, and the extra parts of the p-InP cladding layer 804, the BJ protection layer 806, and the WG layer 802 is removed by dry etching by using the BH mask as an etching mask. Then, an Fe-doped InP-buried layer 809 is grown. After the masks on the laser section and the modulator section are removed, masks are formed on the entire surfaces of the waveguides and the optical multiplexer region to cover the InP-buried layer 809 with the mask, and then stripe-like mesa masks are formed at five positions on the region including the laser section and the modulator section. The p$^+$-InGaAs contact layer 805 and the p-InP cladding layer 804 are removed in this order by etching to form a mesa. Subsequently, by using the usual method, the device is completed by forming a passivated film, and planarizing polyimide, and forming electrodes.

Laser beam emitted from the one laser among four channel lasers arrayed in parallel is introduced via a waveguide 802 and an optical multiplexer 808 into the modulator, and are modulated therein. In the third embodiment, wavelengths of laser beams emitted from the lasers in the first to fourth channels are differentially set to 1540 nm, 1545 nm, 1550 nm, and 1555 nm respectively. By employing the parallel structure as described above, a laser beam having a desired wavelength can be taken out by injecting the current to desired channel. In the third embodiment, the number of channels is four, and a difference in the wavelength is 5 nm, but by using a required number of channels and setting the difference in the wavelength to a required value, the number of selectable wavelengths and the tuning wavelength can be set to desired values respectively. With the device according to the present invention, it is possible to select a laser beam having a desired wavelength and to modulate a laser beam at the frequency of 10 GHz. Although the number of BJ connections is high, the yield in fabrication of device is high.

Signs used in the drawing are described below.
101: n-InP substrate
102: Multiple quantum well 1 layer in the laser section
103: Waveguide layer
104: Multiple quantum well 2 layer in the modulator section
105: p$^+$-InGaAs contact layer
106: p-InP cladding layer
107: Diffraction grating
201: n-InP substrate
202: p-InP cap layer
203: Multiple quantum well 1 layer in the laser section
204: Butt-joint mask1
205: InP cap layer
206: Multiple quantum well 2 layer in the modulator section
207: Butt-joint mask2
208: InP cap layer
209: Waveguide layer
210: p$^+$-InGaAs contact layer
211: p-InP cladding layer
212: Mesa mask
301: InP substrate
302: Waveguide
303: InP cap layer
304: Insulating mask
305: InP cap layer
306: Multiple quantum well layer
401: n-InP substrate
402: Multiple quantum well 1 layer in the laser section
403: Butt joint protection layer
404: Multiple quantum well 2 layer in the modulator section
405: p$^+$-InGaAs contact layer
406: p-InP cladding layer
407: Waveguide layer
408: Diffraction grating
501: n-InP substrate
502: Insulating mask for the protection layer
503: InP cap layer
504: Waveguide layer
505: Multiple quantum well layer in the modulator section
506: InP cap layer
507: Butt joint protection layer
508: p$^+$-InGaAs contact layer
509: p-InP cladding layer
510: Mesa mask
511: Multiple quantum well 1 layer in the laser section
601: InP substrate
602: Waveguide layer
603: Butt joint protection layer
604: Multiple quantum well layer
701: n-InP substrate
702: Multiple quantum well layer in the laser section
703: Butt joint protection layer
704: Diffraction grating
705: p$^+$-InGaAs contact layer
706: p-InP cladding layer
707: Waveguide layer
801: n-InP substrate
802: Waveguide layer
803: Multiple quantum well 1 layer in the laser section
804: p-InP cladding layer
805: p$^+$-InGaAs contact layer
806: Butt joint protection layer
807: Multiple quantum well 2 layer in the modulator section
808: Optical multiplexer
809: Fe-doped InP buried layer
810: Waveguide layer

What is claimed is:

1. An optical integrated device with ridge waveguide structure comprising:
   an optical waveguide region in which a first optical waveguide layer and a second optical waveguide layer are integrated with each other by a butt joint at least at one portion on a semiconductor substrate;
   and upper and lower cladding layers respectively positioned above and under the optical waveguide region for confining the light therein;
   wherein, in a region in which the upper cladding layer is removed for forming a mesa structure of a ridge waveguide, a protection layer is formed between the optical waveguide region and the upper cladding layer to override the butt joint of the first optical waveguide layer and the second optical waveguide layer and to cover at least a portion or all of the butt joint;
   wherein the protection layer is formed in the upper cladding layer.

2. The optical integrated device with ridge waveguide structure according to claim 1, wherein the protection layer is formed on an edge portion of the first optical waveguide layer and on an entire region of the second optical waveguide layer.

3. The optical integrated device with ridge waveguide structure according to claim 1, wherein, at the butt joint between the first optical waveguide layer and the second optical waveguide layer, an edge of the protection layer extends over a surface of the first optical waveguide layer by a distance from 0.01 μm to 10 μm from the butt joint.

4. The optical integrated device with ridge waveguide structure according to claim 1, wherein the first optical waveguide layer consists of multiple quantum well structures emitting or absorbing light, and the second optical waveguide layer consists of a semiconductor bulk layer for propagating light therethrough.

5. The optical integrated device with ridge waveguide structure according to claim 1, wherein materials for forming the first and the second optical waveguide layers and the protection layer consist of a III-V semiconductor material having atoms that are selected from In, Ga, Al, As, P, Sb, and N.

6. The optical integrated device with ridge waveguide structure according to claim 1, wherein the protection layer on an edge portion of the bull joint is extended aside from the first optical waveguide layer and the second waveguide layer.

* * * * *